Figure 1:
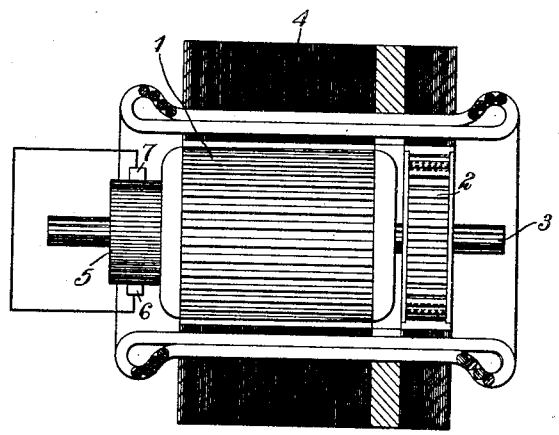

May 15, 1923.

C. A. M. WEBER 1,454,872

COMMUTATOR REPULSION INDUCTION MOTOR,

Filed Oct. 16, 1918

WITNESSES:
J. P. Wurmb
a. a. Brand

INVENTOR
Clifford A. M. Weber.
BY
Wesley S. Carr
ATTORNEY

Patented May 15, 1923.

1,454,872

UNITED STATES PATENT OFFICE.

CLIFFORD A. M. WEBER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

COMMUTATOR REPULSION INDUCTION MOTOR.

Application filed October 16, 1918. Serial No. 258,434.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Commutator Repulsion Induction Motors, of which the following is a specification.

My invention relates to alternating current motors of the single-phase type, and has for its object to provide a motor of the character designated which shall combine the desirable characteristics of both the repulsion type single-phase motor and the induction single-phase motor and which shall, therefore, not only be capable of being started with a minimum line disturbance but which shall also thereafter operate at substantially constant speed, irrespective of the load; in other words, shall have a speed characteristic similar to that of the ordinary shunt motor.

Single-phase alternating current motors of the commutator type are widely used on account of their desirable starting characteristics, viz, high starting torque and low starting currents. However, when such motors are used for substantially constant speed operation, it is necessary to employ some form of governing device therefor which shall short-circuit the commutated winding when in the running position.

Such auxiliary apparatus is, at times, objectionable and one object of my invention, therefore, is to construct a single-phase motor having a commutated winding in which automatic devices of the above-indicated character are dispensed with and, at the same time, these desirable characteristics are obtained.

To this end I provide a single-phase motor with two separate rotor members upon one of which is mounted a commutator and which is provided with the ordinary commutated winding, while the other rotor member is of an ordinary squirrel-cage, induction motor type. Both of these motors are so mounted on a common shaft that their entire length is embraced by the primary field winding, this winding being supplied with energy from any suitable source.

During low speed operation, the squirrel-cage winding exerts motoring torque, assisting the commutated winding, enhancing the low-speed torque and bringing about rapid acceleration. During high-speed operation, the squirrel-cage winding is driven over-synchronously and exerts a braking action upon the commutated winding, reducing the speed from the value that would otherwise be attained establishing the desired constant-speed characteristic.

In a co-pending application, Serial No. 185,707 filed August 11, 1917, by G. H. Garcelon and C. A. M. Weber, and assigned to the Westinghouse Electric & Manufacturing Company, there is illustrated and claimed a single-phase motor, which is electrically similar to the hereinafter described motor in that the torque effects of a commutated winding and of a squirrel-cage winding are combined to obtain desirable speed characteristics.

However, the present application is quite different from this co-pending application in its mechanical aspect. In the latter, the windings are both applied to the same rotor core which must therefore be of special construction, but in the present case, as will be hereinafter noted, the two rotors are entirely separate and for this reason the present rotor is mechanically quite simple since each rotor may be of standard character for the type of winding desired.

For a clearer understanding of my invention, reference may be had to the drawing in which:—

Figure 2:
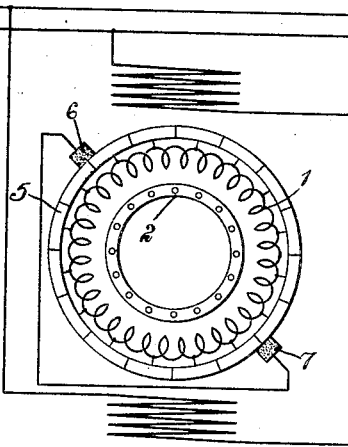
Figure 3:
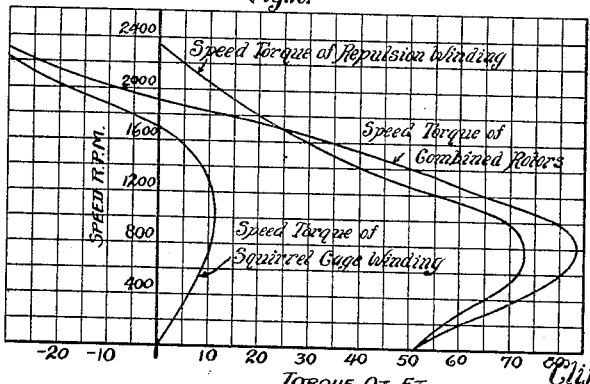

Fig. 1 is a diagrammatic side view of a motor constructed in accordance with my invention; Fig. 2 is a diagrammatic view showing the manner in which the motor is energized; while Fig. 3 shows the speed torque curves obtained from each of the windings independently, as well as the curve obtained when the two operate in conjunction with each other.

Referring now more particularly to Fig. 1, rotors 1 and 2 are shown mounted on a common shaft 3, while a stator member provided with any usual type of winding is shown at 4. It will be noted in this connection that the stator 4 is so disposed that both of the rotors 1 and 2 will, at all times, be under the magnetic influence thereof.

A commutator 5, embodying short-circuited brushes 6 and 7 is associated in the ordinary manner with the rotor 1.

In order to obtain the desired speed characteristics a winding of usual form is applied to the rotor 1 and is so connected to the commutator 5 that, by suitable disposition of the brushes 6—6, a repulsion motor action is secured, while the rotor 2 is provided with an ordinary squirrel-cage structure.

In Fig. 2 I have shown the manner in which the motor is supplied with energy, similar parts being indicated by the same reference characters as employed in Fig. 1.

Referring now to Fig. 3, it will be observed that the combination of the speed torque curves of the two distinct rotors 1 and 2 results in a curve which closely approximates constant speed for any desired load. Moreover, it should be remembered that the necessary high torque at starting is obtained while the desirable running characteristics of the repulsion type motor appear dominant in the running portion of the motor as a whole.

While I have shown the primary member as continuous, it is entirely possible that this member may be composed of two primary cores energized by the same winding, or with two separate windings.

It will also be noted that the proportion of the squirrel-cage rotor is small compared with the rotor to which the repulsion winding is applied.

By the term "repulsion-motor winding," employed in certain of the claims, I mean a combination including a winding and brush arrangement of the well known repulsion motor.

While I have shown my invention as embodied in the specific form herein described, is is, of course, possible that many variations characteristic of the above device may occur to those skilled in the art, and I desire, therefore, to be limited only by the prior art or by the limitations specifically set forth in the appended claims.

I claim as my invention:

1. In a single-phase, alternating current motor, the combination of two rotors mounted on a common shaft, both of said rotors being active at all time to produce torque on said shaft, and one of said rotors being provided with a commutated repulsion-motor winding and the other of said rotors having a squirrel cage winding, and electrically related windings for producing field fluxes for the two rotors, whereby the current conditions in each field winding are affected by the current conditions in the other.

2. In a single-phase, alternating current motor, the combination of two rotors mounted on a common shaft, both of said rotors being active, during the operation of said motor, to produce torque on said shaft, and one of said rotors being provided with a commutated winding having substantially repulsion-motor characteristics, and the other of said rotors having a squirrel-cage winding, the rotor having the squirrel-cage being small as compared with the rotor having the commutated winding, and serially related field-winding means co-acting with said rotors.

3. In a single-phase, alternating current motor, the combination of two rotors mounted on a common shaft, separate stators associated with said rotors, and serially connected primary windings on said stators, both of said rotors being active during the operation of said motor, to produce torque on said shaft, one of said rotors being provided with a winding which gives at all times motor torque having substantially repulsion-motor characteristics, and the other of said rotors being provided with a winding which gives motor torque during starting operation but generator torque during running operation.

4. In a single-phase, alternating current motor, the combination of two rotors mounted on a common shaft both of said rotors being active, during the operation of said motor, to produce torque on said shaft, one of said rotors being provided with a commutated repulsion-motor winding which gives at all times motor torque, and the other of said rotors being provided with a squirrel-cage winding which gives motor torque during starting operation but generator torque during running operation, and electrically related windings for producing field fluxes for the two rotors, whereby the current conditions in each field winding are affected by the current conditions in the other.

5. In an alternating-current motor, the combination with a single field winding, of two rotors mounted on a common shaft, both of said rotors being active to produce torque on said shaft, one of said rotors being wound in such manner as to have a speed-torque characteristic having a relatively high-no-load speed; and the other of said rotors having a relatively low-impedance, closed-circuited secondary winding of the induction-motor type.

6. In an alternating-current motor, the combinatiton with a single field winding, of two rotors mounted on a common shaft, both of said rotors being active to produce torque on said shaft, one of said rotors being provided with a repulsion-motor winding, and the other of said rotors having a relatively low-impedance, closed-circuited secondary winding of the induction-motor type.

7. An alternating-current motor comprising a relatively stationary member and a relatively rotatable member, each of said members being correspondingly provided with two distinct magnetic cores, means for energizing said relatively stationary member, a repulsion-motor commutated winding on one of the magnetic cores of said relatively rotating member, and a relatively low-resistance secondary member of the induction-motor type mounted on the other magnetic core of said relatively rotating member.

In testimony whereof, I have hereunto subscribed my name this 30th day of Sept., 1918.

CLIFFORD A. M. WEBER.